United States Patent
Horneman et al.

(10) Patent No.: US 9,030,972 B2
(45) Date of Patent: May 12, 2015

(54) CONTROL SIGNALING IN SYSTEM SUPPORTING RELAYED CONNECTIONS

(75) Inventors: Kari Veikko Horneman, Oulu (FI); Vinh Van Phan, Oulu (FI); Ling Yu, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 305 days.

(21) Appl. No.: 13/120,697

(22) PCT Filed: Sep. 26, 2008

(86) PCT No.: PCT/EP2008/062901
§ 371 (c)(1),
(2), (4) Date: Apr. 12, 2011

(87) PCT Pub. No.: WO2010/034349
PCT Pub. Date: Apr. 1, 2010

(65) Prior Publication Data
US 2011/0194485 A1  Aug. 11, 2011

(51) Int. Cl.
*H04W 72/00* (2009.01)
*H04B 7/15* (2006.01)
*H04W 72/04* (2009.01)
*H04B 7/155* (2006.01)
*H04L 5/00* (2006.01)
*H04B 7/26* (2006.01)
*H04W 88/04* (2009.01)

(52) U.S. Cl.
CPC ......... *H04W 72/042* (2013.01); *H04B 7/15542* (2013.01); *H04L 5/0044* (2013.01); *H04B 7/2606* (2013.01); *H04W 88/04* (2013.01)

(58) Field of Classification Search
USPC .......................................................... 370/315
See application file for complete search history.

(56) References Cited

U.S. PATENT DOCUMENTS

| | | | |
|---|---|---|---|
| 2006/0003696 A1* | 1/2006 | Diaz Cervera et al. | 455/11.1 |
| 2008/0108369 A1* | 5/2008 | Visotsky et al. | 455/455 |
| 2008/0186900 A1* | 8/2008 | Chang et al. | 370/315 |
| 2009/0034447 A1* | 2/2009 | Yu et al. | 370/315 |
| 2009/0175214 A1* | 7/2009 | Sfar et al. | 370/315 |

FOREIGN PATENT DOCUMENTS

| | | |
|---|---|---|
| EP | 1 613 003 A1 | 4/2006 |
| WO | WO 2008/070007 A2 | 6/2008 |
| WO | WO 2008070007 A2 * | 6/2008 |

OTHER PUBLICATIONS

Hoymann et al. Multihop Communication in Relay Enhanced IEEE 802.16 Networks, 2006, IEEE.*

(Continued)

*Primary Examiner* — Marcus R Smith
(74) *Attorney, Agent, or Firm* — Harrington & Smith

(57) ABSTRACT

The present invention presents a solution for controlling data transmission with respect to relayed communication links in a cell of a cellular telecommunication system. A first connection is established as a relayed communication link between a first terminal device and a serving base station through a second terminal device operating as a relay terminal for the relayed communication link, and a second connection is established between the second terminal device and the serving base station. Control messages defining dynamic radio resource allocation for both first connection and second connection are used in signaling exchanged between the serving base station and the relay terminal.

18 Claims, 3 Drawing Sheets

(56) References Cited

OTHER PUBLICATIONS

Sharp, UE Identity in L1/L2 Downlink Control Signalling, 2006, 3GPP TSG-RAN WG1#45.*

Nokia, DL L1/L2 control signaling channel encoding structures, 2006, 3GPP TSG-RAN WG1 LTE AdHoc.*

Hoymann, C., et al., "Multihop Communication in Relay Enhanced IEEE 802.16 Networks", © 2006 IEEE, 4 pgs.

R1-061907, 3GPP TSG-RAN WG1 LTE AdHoc, Cannes, France, Jun. 27-30, 2006, "DL L1/L2 Control Signaling Channel Encoding Structures", 8 pgs.

* cited by examiner

CONTROL SIGNALING IN SYSTEM SUPPORTING RELAYED CONNECTIONS

FIELD

The invention relates to the field of relayed cellular radio telecommunications and, particularly, to control signaling related to relayed communication links in such a system.

BACKGROUND

Modern cellular telecommunication systems and terminals of such systems are capable of supporting device-to-device communication capabilities for efficient and cost-effective content delivery, network operation and performance. Accordingly, two terminals located relatively close to each other in the same cell may be configured by the network to communicate over a direct connection instead of routing the data through a cellular network. It is even known that an ad hoc network among multiple terminal devices may be formed based on the IEEE 802.11 standard, for example, and connections with the cellular network may utilize this ad hoc network to improve the overall coverage and performance of the cellular system. This is implemented by providing a shadowed terminal device with a relayed connection to a serving base station through a relay terminal. The relayed link utilizes a device-to-device connection between the shadowed terminal device and the relay terminal and a regular cellular connection between the relay terminal and the serving base station. As a consequence, the relayed terminal effectively relays data of the shadowed terminal device.

Control signaling related to such relayed communication links is challenging in terms of compatibility with the cellular system, simplicity and protocol overhead.

SUMMARY

In an embodiment of the invention, a method comprises providing a first connection established as a relayed communication link between a first terminal device and a serving base station through a second terminal device operating as a relay terminal for the relayed communication link, providing a second connection between the second terminal device and the serving base station, and using control messages defining dynamic radio resource allocation for both first connection and second connection, in Signaling exchanged between the serving base station and the relay terminal.

In another embodiment of the invention, an apparatus comprises an interface configured to transmit and receive information, and a controller configured to conduct communication, through the interface, with respect to a first Connection established as a relayed communication link between a first terminal device and a serving base station through a second, terminal device operating as a relay terminal for the relayed communication link, to conduct communication, through the interface, with respect to a second connection between thy second terminal device and the serving base station, and to use control messages defining dynamic radio resource allocation for both first connection and second connection in signaling exchanged between the serving base station and the relay terminal.

In another embodiment of the invention, an apparatus comprises means for providing a first connection established as a relayed communication link between a first terminal device and a serving base station through a second terminal device operating as a relay terminal for the relived communication link, means for providing a second connection between the second terminal device and the serving base station, and means for using control messages defining dynamic radio resource allocation for both first connection and second connection in signaling exchanged between the serving base station and the relay terminal.

LIST OF DRAWINGS

Embodiments of the present invention are described below, by way of example only, with reference to the accompanying drawings, in which FIG. 1 illustrates utilization of relayed communication links in a cell of a mobile telecommunication system;

DESCRIPTION OF EMBODIMENTS

Figure 1:
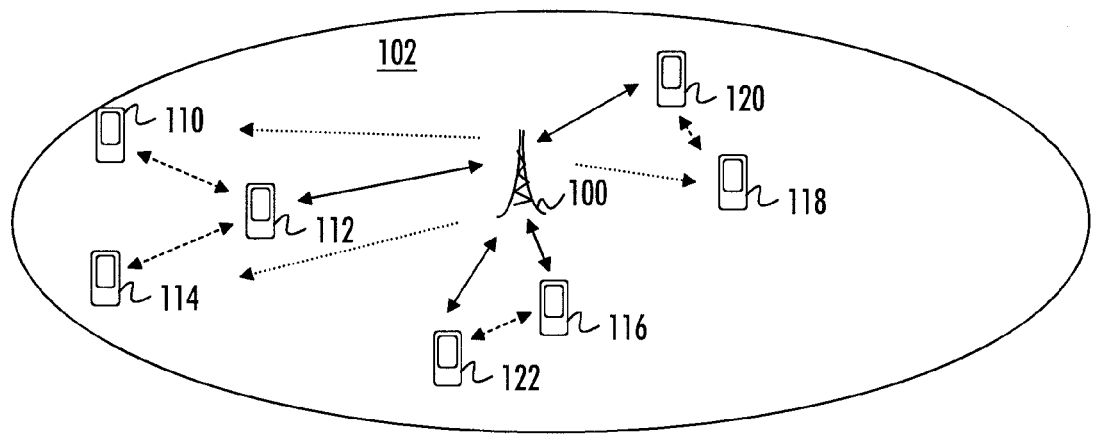

FIG. 1 illustrates communication links in a cell 102 of a mobile telecommunication system according to an embodiment of the invention. Referring to FIG. 1, the cell 102 is associated with a base station 100 controlling communications within the cell. The cell 102 controlled by the base station 100 may be divided into sectors. The base station 100 may control cellular radio communication links established between the base station 100 and a plurality of terminal devices 110 to 122 located within the cell 102.

As noted in the background section, device-to-device connections and ad hoc networks may be established among the terminal devices 110 to 122. Let us now discriminate the cellular radio connections from the device-to-device connections by denoting that a cellular radio communication link is established directly between a terminal device and the base station 100, and the cellular radio communication link may be established and operated according to a given radio standard supported by the mobile communication system of the base station 100. Such a standard may be a long-term evolution of the UMTS (Universal Mobile Telecommunication System), for example. Additionally, the terminal device may support other communication protocol standards, such as GSM, GPRS, EDGE.

Furthermore, device-to-device communication links are established directly between two terminal devices, e.g. between terminal devices 118 and 120 in FIG. 1. The device-to-device connections may be based on cognitive radio technology. Accordingly, the terminal devices may be equipped with cognitive radio capability to provide the device-to-device communication links according to any of a plurality of radio access technologies. Moreover, the terminal devices are equipped with capability of adaptively selecting one of the supported radio access technologies according to the communication environment. Such radio access technologies may include standard and non-standard radio access technologies, e.g. Wireless LAN (IEEE 802.11), Bluetooth®, Ultra Wide Band. The radio access technologies may operate on the same frequency band as the cellular communication links and/or outside those frequency bands to provide the arrangement with flexibility.

Terminal devices supporting the device-to-device connections may be used to implement relayed communication links, wherein a communication link between a first terminal device (source terminal) and a serving base station is established through a second terminal device operating as a relay terminal. Efficient utilization of relayed communication links improves the capacity and coverage of the cellular telecommunication system. The selection of whether to use a direct or relayed connection may be made by the terminal device itself, by the serving base station in a centralized manner, or as a result of negotiation between the terminal device and the serving base station.

Since the connection of the source terminal is conveyed through the relay terminal because of a poor communication link between the source terminal and the serving base station, control signaling related to the physical layer transmission of the relayed communication link should be directed to the relay terminal. A reasonable implementation for the control signaling should be derived so as to reduce signaling overhead with preferably no or minimum changes to the hosting cellular system.

Figure 2:
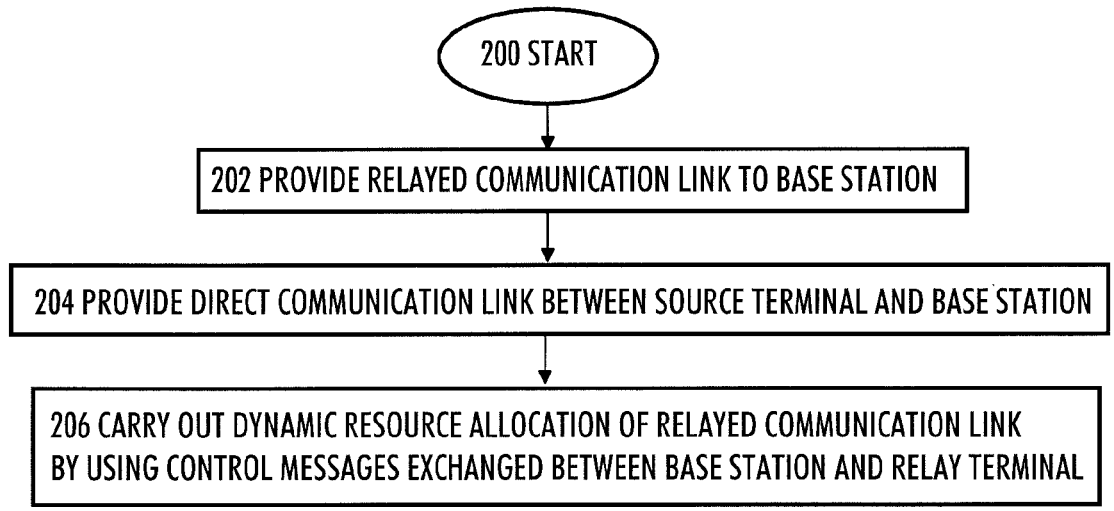
FIG. 2 illustrates a process for signaling dynamic resource allocation when utilizing the relayed communication links.

Let us refer to FIG. 2 and describe the general concept of providing such a procedure according to an embodiment of the invention. FIG. 2 illustrates a process for determining the load of the relayed connection on the relay terminal. FIG. 2 illustrates the process on a general level, and the process may be carried out by a controller applicable to the relay terminal and/or a network element, such as the serving base station. The process starts in block 200. In block 202, a relayed communication link between a source terminal and a serving base station is provided through a relay terminal. From the point of view of the serving base station, block 202 comprises establishing a logical connection between the source terminal and the base station, wherein the logical connection is mapped to a physical connection between the base station and the relay terminal. From the point of view of the relay terminal, block 202 comprises establishment of a device-to-device connection with the source terminal according to a selected radio access technology, establishment of a physical connection with the base station and mapping the device-to-device connection to the physical connection. The mapping may be carried out on a physical layer or link layer, as will be described below. A hybrid scheme is also possible, wherein the mapping is carried out on the physical layer in uplink and on the link layer in downlink, for example. In block 204, a direct communication link is provided between the relay terminal and the serving base station. The direct communication link represents a communication link established to transfer data related to an application executed in the relay terminal. In other words, data of the relay terminal itself is to be transferred over the direct link, and data of the source terminal is to be transferred over the relayed communication link.

Figures 3A, 3B:
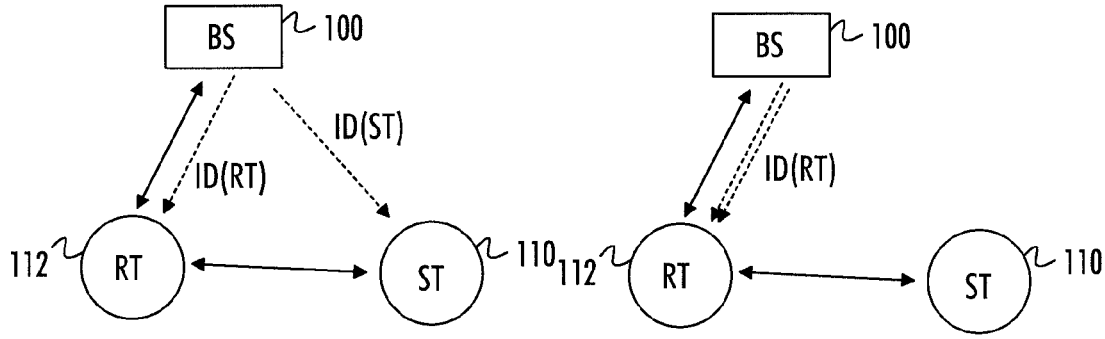
FIG. 3A shows an embodiment of implementing control signaling according to an embodiment of the invention.
FIG. 3B shows another embodiment of implementing control signaling according to an embodiment of the invention.

In block 206, physical layer dynamic resource allocation of the relayed communication link is carried out by transfer of control messages between the base station and the relay terminal. It is assumed that the physical link between the relay terminal and the base station is implemented as a packet access connection, wherein the base station dynamically allocates radio resources to terminal devices it serves. The resource allocation is carried out as fast scheduling on a physical downlink control channel (PDCCH) the terminal devices are configured to listen. The relay terminal is configured to detect and receive the PDCCH not only for the direct communication link but also for the relayed communication link. FIGS. 3A and 3B below illustrate two embodiments of how to carry out block 206.

FIG. 3A illustrates an embodiment in which the relay terminal is configured to detect and receive physical layer control signals destined to the source terminal. In this embodiment, the base station 100 may transmit PDCCH scheduling (control) messages to both source and relay terminals 110, 112 as if both terminals had a direct communication link with the base station 100. In other words, the base station may carry out the transmission of PDCCH control messages such that a control message scheduling a radio resource to the relayed link comprises an identifier of the source terminal 110. Similarly, a control message scheduling a radio resource to the direct link between the relay terminal 112 and the base station 100 comprises an identifier of the relay terminal 112.

The relay terminal 112 is configured to monitor the PDCCH for control messages destined both to itself and to the source terminal 110. In other words, the relay terminal 112 monitors the identifiers of PDCCH control messages and, upon detection of a control message comprising the identifier of either the source terminal 110 or the relay terminal 112, the relay terminal 112 extracts the contents of the control message. If the control message comprises the identifier of the source terminal 110, the relay terminal 112 processes transmission/reception of physical layer data packets of the direct communication link according to the control message. On the other hand, if the control message comprises the identifier of the relay terminal 112, the relay terminal 112 processes transmission/reception of physical layer data packets of the relayed communication link according to the control message.

The source terminal 110 may also be configured to attempt reception of the control messages destined to the source terminal 110. Particularly, the source terminal 110 may be configured to receive downlink control messages so as to keep track that all the scheduled data packets are received at the source terminal. It is to be noted that the downlink control messages relate to the downlink transmission of the data packets between the base station 100 and the relay terminal 112, and the data packets must still be transmitted from the relay terminal 112 to the source terminal 110. Accordingly, the source terminal 110 may track the transmission of data packets from the base station 110 to the relay terminal 112 by monitoring the control messages and then verify that the corresponding data packets are received through the device-to-device connection. Additionally, the source terminal 110 may monitor the control messages so as to stay synchronized with the base station 100 and for other control purposes. Alternatively, a second identifier may be assigned to the source terminal for direct communication with the base station, e.g. for synchronization purposes. The second identifier may be unknown to the relay terminal.

FIG. 3B illustrates an embodiment in which the control message of the relayed communication link is transmitted in a control message comprising the identifier of the relay terminal. In this case, the base station 100 is configured to transmit the PDCCH scheduling (control) messages related to both relayed and direct communication link to the relay terminal 112. In other words, the base station 100 includes the identifier of the relay terminal 112 also in the control messages related to the relayed communication link. As a consequence, the relay terminal 112 needs only to monitor for control messages comprising the identifier of the relay terminal 112. The base station 100 may still transmit the control messages of the relayed link and the direct link as separate control messages. However, the signaling may be carried out more efficiently by embedding the scheduling information of both communication links in the same control message. This is particularly advantageous when at least portion of the scheduling information of the communication links are identical and, thereby, contains redundancy. Then, the control message may simply comprise an indicator (either explicit or implicit) that the same field of the control message applies to both direct and relayed communication link.

An advantage of the embodiment of FIG. 3A is that the implementation of relayed connections in the cellular system may be carried out with minimal structural and functional modifications to the network and, in particular, to the base station 100. The embodiment of FIG. 3B has the advantage that signaling overhead may be reduced by combining the control information of both source and relay terminals in the same control message.

Tables 1 and 2 below describe downlink and uplink control messages, respectively, transmitted on the PDCCH. The downlink control message is used for downlink scheduling to enable the relay terminal to receive a correct physical layer transport block, and the uplink control message is used for uplink scheduling to enable the relay terminal to transmit physical layer transport blocks in allocated transmission resources. Tables 1 and 2 define only exemplary control messages not limiting the invention in any way.

TABLE 1

| Field | Size (bits) | Comments |
|---|---|---|
| UE ID (C-RNTI) | 16 | Identifier of terminal device |
| Format | 1 | Defines structure of message |
| Radio resource assignment indicator | N | Allocates downlink radio resource |
| MCS | 5 | Defines modulation and coding scheme |
| HARQ process # | 3 | Indicates HARQ process number of transport block |
| New data indicator | 1 | New data or retransmission |
| Redundancy version | 2 | Redundancy version for HARQ |
| TPC | 2 | Power control bits for uplink |
| CRC | 16 | Mask for UE ID |

TABLE 2

| Field | Size (bits) | Comments |
|---|---|---|
| UE ID (C-RNTI) | 16 | Identifier of terminal device |
| Format | 1 | Defines structure of message |
| Hopping flag | 1 | Frequency hopping on/off |
| Radio resource assignment indicator | M | Allocates downlink radio resource |
| MCS | 5 | Defines modulation and coding scheme |
| New data indicator | 1 | New data or retransmission |
| TPC | 2 | Indicates relative power control command of PUSCH |
| Cyclic shift for demodulation of reference symbol | 3 | Defines a shift to be used for generation of demodulation reference signal |
| CQI | 1 | Indicates whether CQI is present in PUSCH |
| Sounding pilot indicator | 1 | Indicates whether or not a sounding pilot signal is present in the uplink transmission |
| ACK/NACK reservation | 1 | Indicates whether or not resource on PUSCH is reserved for ACK/NACK |
| CRC | 16 | Mask for UE ID |

In Tables 1 and 2, UE ID defines the identifier of the terminal device to which the control message is destined. The identifier may be a cell-specific radio network temporary identifier (C-RNTI) known to be used in the cellular systems based on the long-term evolution of the UMTS. The C-RNTI is a cellular identifier unique to each active terminal device in a given cell. A radio resource assignment indicator defines radio resource allocation for a physical transport block, and the length of the indicator depends on the number of radio resource blocks that can be allocated in the system. In other words, the radio resource assignment indicator in the downlink control message indicates the radio resource from which the terminal device should receive the scheduled transport block. Similarly, the radio resource assignment indicator in the uplink control message indicates the radio resource the terminal device should use to transmit the scheduled transport block. The acronyms of Tables 1 and 2 are defined as: HARQ (hybrid automatic repeat request), CQI (channel quality indicator), PUSCH (physical uplink shared channel), ACK/NACK (positive/negative acknowledgment), TPC (transmit power control), CRC (cyclic redundancy check).

The control messages of Tables 1 and 2 may be used in the embodiment of FIG. 3A, when separate control messages are transmitted for the relayed link and the direct link. The control messages of Tables 1 and 2 may be used also in the embodiment of FIG. 3B, when the identifier (C-RNTI) of the source terminal is replaced by the identifier (C-RNTI) of the relay terminal in the control message related to the relayed communication link.

Figure 4:
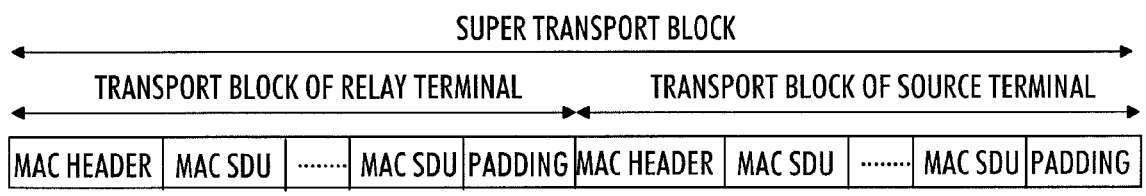
FIG. 4 illustrates a super transport block carrying multiplexed transport blocks of two connections.

According to an embodiment of the invention, transport blocks of the direct and relayed communication links may be multiplexed into the same physical layer transport block and transmitted in the same radio resource. Such a physical layer transport block, to which transport blocks of multiple connections are multiplexed, is called a super transport block in this description from now on. FIG. 4 illustrates the structure of such a super transport block. The super transport block illustrated in FIG. 4 contains only one transport block of the direct communication link (transport block of the relay terminal) and one transport block of the relayed communication link (transport block of the source terminal) but the super transport block may contain a higher number of transport blocks, and the portions of the super transport block allocated to each communication link may be fixed or signaled in the control messages.

Each transport block may have a conventional structure and comprise a medium access control (MAC) header and MAC service data units (SDU) carrying payload data. "Padding bits" may be added to the end of the transport block to fit the predefined size of the transport block. The multiplexing of the transport blocks may be added basically to any step of transmission/reception processing, e.g. before/during/after channel decoding.

To control the multiplexing of the transport blocks into the super transport block, the control message may include additional fields, as illustrated in Table 3 below. The additional field may be included in both uplink and downlink control messages of Tables 1 and 2.

TABLE 3

| Field | Size (bits) | Comments |
|---|---|---|
| Multiplexing flag | 2 | Indicates number of TBs multiplexed |
| Virtual ID #1 | 2 | Virtual identifier of source terminal 1 |
| TB Size 1 | 2 | Size of TB for source terminal 1 |
| Virtual ID #2 | 2 | Virtual identifier of source terminal 2 |
| TB Size 2 | 2 | Size of TB for source terminal 2 |
| ... | ... | ... |

In Table 3, a multiplexing flag may indicate the number of transport blocks (TB) multiplexed into one super transport block or simply whether multiplexing is present in the corresponding transport block. A virtual identifier shorter than the 16-bit C-RNTI is assigned to each source terminal the relay terminal serves with a relayed communication link. The length of the virtual identifier depends on the maximum number of source terminals the relay terminal is capable of serving simultaneously, or the network may also set the length of the virtual identifier as a fixed value. The size of the transport block of each source terminal multiplexed into the super transport block is defined by the transport block size indicator associated with each virtual identifier in the control message. The control fields of Table 3 are merely exemplary. For example, the transport block size may be fixed and, therefore, the transport block size fields may be omitted. Alternatively, the transport block size fields may be omitted, and the transport block size may be deduced from the radio resource assignment indicator defined in Tables 1 and 2. Instead of using individual virtual identifier fields, a single virtual identifier field may be used, wherein a certain bit combination indicates which source terminals (and the relay terminal) should have a transport block multiplexed into the same super transport. For example, a bit combination '00' may denote that TBs of the relay terminal and source terminal 1 should be multiplexed, a bit combination '01' may denote that TBs of the relay terminal and source terminal 2 should be multiplexed, a bit combination '10' may denote that TBs of the source terminal 1 and source terminal 2 should be multiplexed, and a bit combination '11' may denote that TBs of the relay terminal, source terminal 1, and source terminal 2 should be multiplexed into the same super transport block to which a radio resource is allocated in the radio resource assignment indicator field of the control message.

Above, the radio resource to which the multiplexing of transport blocks is considered as a time-frequency resource, i.e. a certain bandwidth for a determined duration. The duration may be a fixed transmission time interval in the order of milliseconds specified by the system. Table 4 below describes a control message for use in case spatial multiplexing is used, i.e. transport blocks of different links are allocated to different spatial streams. Effectively, this refers to multiple-input-multiple-output transmission in which data is exchanged between the relay terminal and the base station through multiple spatially distributed communication paths. In Table 4, the $1^{st}$ transport block may be a transport block of the direct link, while the $2^{nd}$ transport block is a transport block of the relayed link. The structure of Table 4 is similar to that of Table 1 except for the fact that transmission parameters are defined separately for the two transport blocks transmitted through different MIMO paths.

TABLE 4

| Field | Size (bits) | Comments |
| --- | --- | --- |
| UE ID (C-RNTI) | 16 | Identifier of terminal device |
| Format | 1 | Defines structure of message |
| Radio resource assignment indicator | N | Allocates downlink radio resource |
| TPC | 2 | Power control bits for uplink |
| Number of layers | 2 | Transmission technique for MIMO |
| HARQ process # | 3 | Indicates HARQ process number of transport block |
| MCS $1^{st}$ TB | 5 | Defines modulation and coding scheme for $1^{st}$ TB |
| New data indicator $1^{st}$ TB | 1 | New data or retransmission for $1^{st}$ TB |

TABLE 4-continued

| Field | Size (bits) | Comments |
| --- | --- | --- |
| Redundancy version $1^{st}$ TB | 2 | Redundancy version for HARQ for $1^{st}$ TB |
| MCS $2^{nd}$ TB | 5 | Defines modulation and coding scheme for $2^{nd}$ TB |
| New data indicator $2^{nd}$ TB | 1 | New data or retransmission for $2^{nd}$ TB |
| Redundancy version $2^{nd}$ TB | 2 | Redundancy version for HARQ for $2^{nd}$ TB |
| HARQ swap flag | 1 | Swap transport blocks before buffered |
| CRC | 16 | Mask for UE ID |

The above-described embodiments of the invention relate to discrimination of the relayed and direct communication links on the physical layer. In other words, the relay terminal receives physical layer data packets from the source terminal over the device-to-device connection and forwards them to the base station according to the uplink scheduling allocated by the base station. In a similar manner, the relay terminal receives downlink data packets related to the relayed communication link on a radio resource indicated in a downlink scheduling control message and forwards the downlink data packets to the source terminal through the device-to-device connection. In another embodiment of the invention, the relayed and direct communication links are discriminated in data link layer (referred to also as layer 2). In this embodiment, the relay terminal establishes a logical connection with the source terminal over the device-to-device physical connection and with the base station in relation to the relayed communication link. Accordingly, the relay terminal has two (or more according to the number of served source terminals) logical connections with the base station: one for the relayed link and the other for the direct link. Now, the multiplexing of data packets of the direct and relayed communication links is transparent to the physical layer, because the logical connections are multiplexed into the same physical connection. Therefore, the physical layer (radio interface) signaling can be implemented as if there was only one connection between the relay terminal and the base station. The data packets of the direct and relayed communication links may be discriminated on the physical layer with the virtual identifiers described above, wherein a header of each transport block may comprise a virtual identifier of the terminal (either source or relay) to which the transport block belongs. Alternatively, the discrimination may be made on the data link layer, wherein each logical connection has a distinct identifier and each link layer data packet has the identifier in its header, e.g. MAC header.

In an embodiment of the invention one of the physical layer multiplexing is used in one of the uplink and downlink communication directions, and the data link layer multiplexing is used in the other communication direction. Particularly, data link layer multiplexing may be implemented in downlink, and the physical layer multiplexing may be implemented in uplink. Accordingly, physical layer downlink control messages may be implemented as described in Table 1, and physical layer uplink control messages may be implemented as described in Tables 2 and 3.

Figure 5:
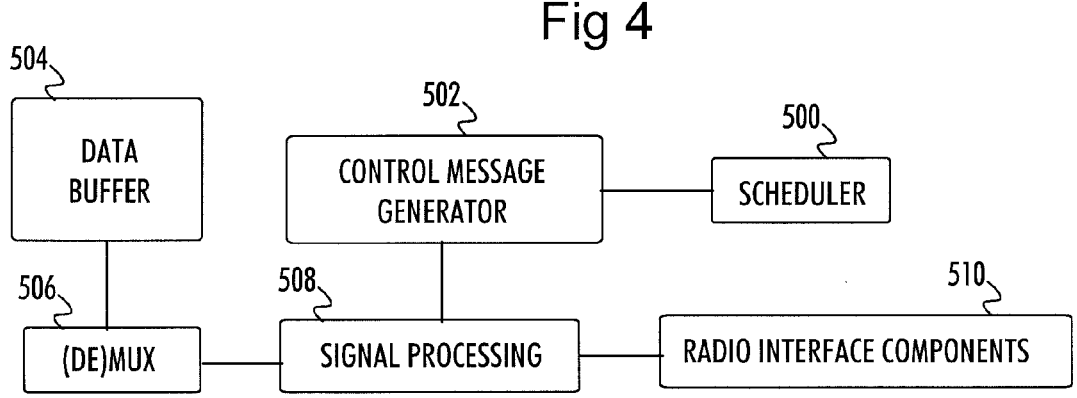
FIG. 5 illustrates the structure of a network element carrying out dynamic resource allocation for communication links in a cell.

FIG. 5 illustrates elements of a network element, such as the base station, carrying out the scheduling of radio resources to direct and relayed communication links in a cell of the cellular telecommunication system in which embodiments of the invention are utilized. A scheduler 500 carries out the radio resource allocation to physical connections established in the cell. As mentioned above, the scheduling is dynamic to enable efficient utilization of radio resources. Let us consider scheduling with respect to the relayed and the direct communication links described above. The scheduler 500 allocates uplink and downlink radio resources to the relayed communication link and the direct communication link and outputs scheduling information to a control message generator 502. The scheduler 500 may also control the multiplexing of the transport blocks of relayed and direct links into the same super transport block.

The control message generator 502 generates an uplink control message and a downlink control message having a format according to the specifications in use in the cell. The format of the control message may be predetermined and fixed during the communications. Embodiments of the control message formats are described above in connection with Tables 1 to 3. The control message generator 502 may generate separate control messages to the relayed and direct links and include the C-RNTI of the relay terminal in the control messages of the direct link and the C-RNTI of the source terminal in the control messages of the relayed link. Alternatively, the control message generator 502 may include the uplink/downlink control information of the direct and relayed link in the same control message, as described above. In the most basic form, the apparatus implementing the control message according to an embodiment of the invention is the control message generator realized by one or more processing units.

When the control message generator 502 has created the control messages, a signal-processing unit 508 performs signal processing operations, such as channel encoding, modulation, on the control message and forwards the modulated control message to radio interface components 510 configured to transfer the control message to a radio frequency band and transmit the control message to a radio interface.

A data buffer 504 stores data to be transmitted to the relay terminal over the direct and/or relayed communication link. A multiplexer 506 is configured to acquire transport blocks from the data buffer 504 and to multiplex the transport blocks into a super transport block under the control of the scheduler 500. Then, the (super) transport blocks are processed by the signal-processing unit 508 and transmitted through the radio interface components to the radio interface in radio resources corresponding to those indicated in the downlink control message.

The operation is similar in uplink direction. The radio interface components 506 and the signal-processing unit 508 receive a super transport block in radio resources specified in the uplink control message process the received transport block. The multiplexer 506 now operates as a demultiplexer configured to demultiplex the transport blocks from the super transport block under the control of the scheduler 500. Then, the demultiplexed transport blocks are applied to the data buffer 504 for higher layer processing.

Figure 6:
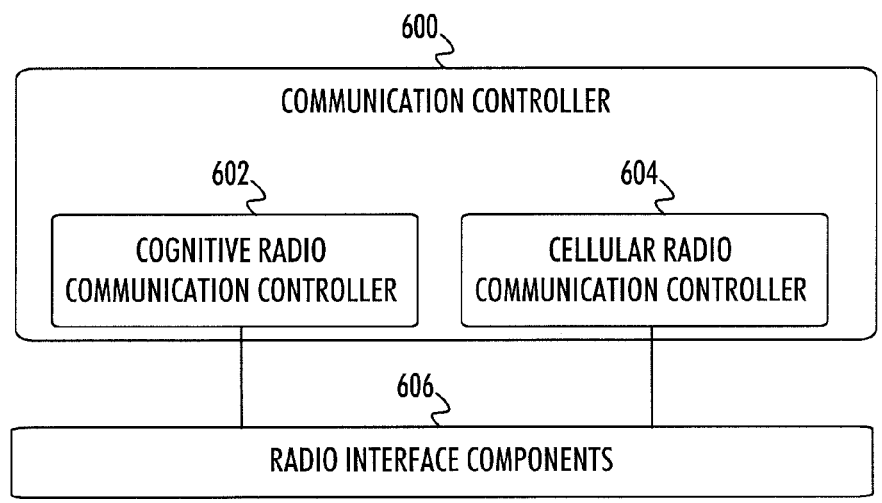
FIG. 6 illustrates an embodiment of the structure of a terminal device capable of serving as a relay terminal.

FIG. 6 illustrates a structure of an apparatus applicable to function as the relay terminal. The source terminal may also be configured to function as the relay terminal, i.e. the source terminal and the relay terminal may in practice have the same physical structure. The apparatus comprises radio interface components 606 capable of providing radio communication parameters according to the physical layer protocols of one or more cellular telecommunication systems supported by the relay terminal. Additionally, the radio interface components 606 may be configured to provide radio communication parameters according to a plurality of device-to-device radio communication protocols, e.g. one or more of the radio communication protocols listed above. The radio interface components 606 may include digital signal processing elements capable of providing multiple modulation, coding, and other signal processing operations on the baseband for signals to be transmitted and/or received. Additionally, the radio interface components 606 may comprise analog components, at least some of which may be software defined to provide support for the wide range of radio access technologies.

The apparatus further comprises a higher-level controller 600 controlling the operation and inter-operability of both direct cellular radio communication links with the serving base station and other parts of the serving cellular network and the cognitive radio based device-to-device communication links with the other terminal devices. The communication controller 600 may provide linking between the cognitive radio connections and the cellular radio connections to provide the relayed link. Upon establishment of the relayed communication link through the relay terminal, the communication controller 600 receives data from the source terminal and maps the data to the connection established between the communication controller 600 and the serving base station. Similarly, the communication controller maps the data received from the serving base station over the established connection to the device-to-device connection.

The communication controller 600 may be configured to establish a radio resource control (RRC) connection with the serving base station in order to control the operation and parameters of the relayed communication link. Properties of the device-to-device connections of the relay terminal may be directly configured by the base station through RRC signaling. The RRC signaling may be used to configure also the radio access technologies and communication parameters of the cognitive radio communication links.

The communication controller 600 comprises two sub-controllers: a cognitive radio communication controller 602 and a cellular radio communication controller 604. The cellular radio communication controller 604 is configured to establish, operate, and terminate cellular radio connections with a serving base station of a serving cellular network. The cellular radio communication controller 604 may also convey data and control signals related to the cognitive radio communication links under the control of the higher-level communication controller 600 so as to provide another terminal device with a relayed connection.

The base station may control the device-to-device connections in order to provide efficient utilization of radio resources in the cell. Accordingly, the communication controller 600 may communicate with the serving base station through the cellular radio communication controller 604 in order to negotiate radio access technologies for use in direct device-to-device communications with the other terminal devices in the same cell and communication parameters to be used.

The cognitive radio communication controller 602 is configured to establish, operate, and terminate cognitive radio connections (device-to-device connections) established with the other terminal devices. The cognitive radio communication controller 602 may receive the radio access technologies and communication parameters available for use from the communication controller 600. Then, the cognitive radio communication controller 602 may determine the communication parameters to be used in the cognitive radio communication link on the basis of the available communication parameters and the channel environment between the two terminal devices between which the device-to-device connection is to be established. The cognitive radio communication controller 602 may negotiate about the communication parameters to be used with a corresponding cognitive radio communication controller in the source terminal. The determination of the communication parameters may include the determination of modulation and coding schemes, frequency band, bandwidth, data rate, transport block size, diversity method, etc.

Figure 7:
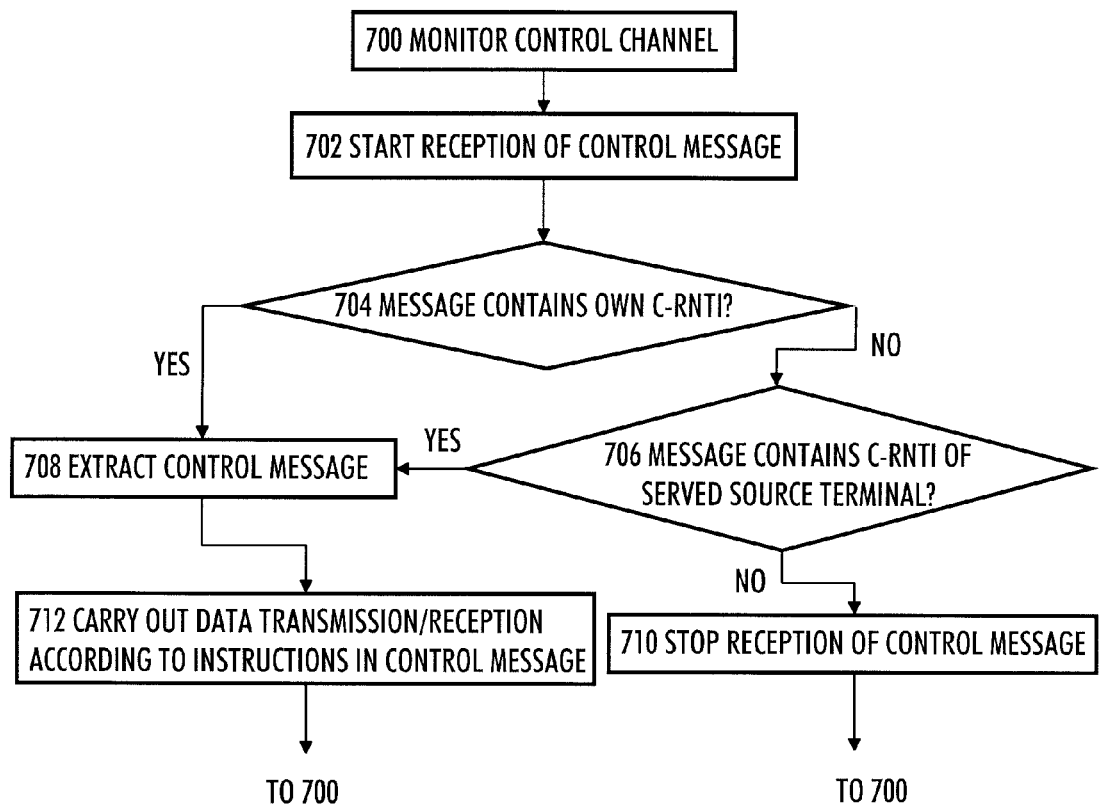
FIG. 7 illustrates an embodiment of a process for receiving control messages in a relay terminal and for performing transmission/reception according to the received control messages.

FIG. 7 illustrates a process for receiving control messages from the serving base station in the relay terminal and for controlling transmission and reception of the transport blocks between the relay terminal and the serving base station. The process of FIG. 7 may be implemented in the cellular radio communication controller 604 of FIG. 6 realized by one or more processing units.

Referring to FIG. 7, the relay terminal monitors a control channel carrying uplink and downlink scheduling control messages in block 700. In block 702, the relay terminal detects a control message on the control channel and starts reception of the control message. In block 704, it is checked if the received control message contains an identifier (C-RNTI) of the relay terminal. If the control message does not contain the identifier of the relay terminal, the process moves to block 706 where it is checked if the received control message contains an identifier of a source terminal served by the relay terminal with a relayed communication link. If the control message does not contain the identifier of the source terminal, the process moves to block 710 where the processing of the received control message is stopped and the process returns to block 700 to wait for reception of a new control message.

On the other hand if the received control message contains the identifier of the relay terminal, the process moves from 704 to block 708 where the control message is extracted and its contents are analyzed. Then, the data transmission/reception is carried out according to the instructions contained in the received control message in block 712. If the control message is a downlink control message indicating that there is a super transport block to be received on designated radio resources, the relay terminal processes the reception of a signal on the designated radio resources, separates transport block contained in the super transport block, identifies the terminals to which the transport blocks are destined from either the received control messages or from header information of the received transport blocks. Then, the relay terminal forwards the transport blocks of the relayed communication link(s) for transmission to the corresponding source terminal. Furthermore, the relay terminal forwards the transport blocks of the direct communication link for higher level processing. The procedure is reversed for transmission, where the relay terminal acquires transport blocks from buffers of the connections to be multiplexed to the same super transport block. Then, the relay terminal performs the multiplexing operations and necessary transmission processing and transmits the super transport block in the radio resources designated in the received uplink control message. From block 712, the process returns to block 700.

The processes or methods described in FIGS. 2 and 7 may also be carried out in the form of a computer process defined by a computer program. The computer program may be in source code form, object code form, or in some intermediate form, and it may be stored on a carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
providing a first connection established as a relayed communication link between a first terminal device and a serving base station through a second terminal device operating as a relay terminal for the relayed communication link, wherein the second terminal device is configured to establish a device to device connection with the first terminal device and a cellular connection with the serving base station;
providing a second connection between the second terminal device and the serving base station;
using control messages defining dynamic radio resource allocation for both first connection and second connection in signaling exchanged between the serving base station and the relay terminal; and
multiplexing together at least one data transport block of the first connection and at least one data transport block of the second connection into a single super transport block of a predefined block size for transmission between the serving base station and the second terminal device in the same time-frequency radio resource allocated to both first and second connections, wherein the time-frequency radio resource has a specified bandwidth and a specified duration.

2. The method of claim 1, further comprising: providing scheduling information in a control message identifying the relay terminal and configuring the relay terminal to perform monitoring to detect control messages comprising an identifier of the relay terminal and to extract the scheduling information for both the first connection and the second connection upon detecting the identifier of the relay terminal in the control message.

3. The method of claim 1, further comprising:
providing, in a control message scheduling the same time-frequency resource to the first connection and to the second connection, a multiplexing indicator indicating that at least one transport block of the first connection and at least one transport block of the second connection are multiplexed together into the same frequency resource.

4. The method of claim 3, further comprising:
providing at least a third connection established as a relayed communication link between a third terminal device and the serving base station through the second terminal device operating as the relay terminal for the third connection;
providing the scheduling information for said first, second and third connections in a control message identifying the relay terminal; and
identifying information elements related to the first terminal device and the third terminal device in the control message with a virtual identifier which is shorter in length than the identifier of the relay terminal.

5. The method according to claim 1, wherein uplink transport blocks of different connections are distinguished from each other on a physical layer, the method further comprising:
establishing, in the relay terminal with respect to each relayed communication link, a first logical connection between the relay terminal and the terminal device served by the relayed communication link and a second logical connection between the relay terminal and the serving base station; and
distinguishing the downlink transport blocks of different connections from each other on a data link layer on the basis of different logical connections, wherein the data link layer is a layer higher than the physical layer.

6. The method of claim 5, further comprising: distinguishing logical connections associated with different terminal devices, with which the relay terminal provides a relayed communication link, with a unique virtual identifier included in each downlink data link layer data packet, wherein the virtual identifier is shorter in length than a cellular identifier identifying the terminal devices in a cellular telecommunication network comprising the serving base station.

7. The method of claim 1, further comprising multiplexing a data transport block of the first connection and a data transport block of the second connection into the same time-frequency radio resource by using spatial multiplexing.

8. The method of claim 1, further comprising providing scheduling information of the first connection and scheduling information of the second connection in separate control messages, and configuring the relay terminal to detect and receive control messages comprising the identifier of the first terminal device and to extract the scheduling information for the first connection up on detecting the identifier of the first terminal device in the control message.

9. An apparatus comprising:
at least one processor;
memory storing computer program code;
wherein the memory storing the computer program code is configured to, with the at least one processor, cause the apparatus to at least;
conduct communication, through an interface configured to transmit and receive information, with respect to a first connection established as a relayed communication link between a first terminal device and a serving base station through a second terminal device operating as a relay terminal for the relayed communication link;
conduct communication, through the interface, with respect to a second connection between the second terminal device and the serving base station;
use control messages defining dynamic radio resource allocation for both the first connection and the second connection in signaling exchanged between the serving base station and the relay terminal; and
multiplex together at least one data transport block of the first connection and at least one data transport block of the second connection into a single super transport block of a predefined block size for transmission between the serving base station and the second terminal device in the same time-frequency radio resource allocated to both first and second connections, wherein the time-frequency radio resource has a specified bandwidth and a specified duration.

10. The apparatus of claim 9, wherein the controller is further configured to use scheduling information for the first connection and the second connection, in a control message identifying the relay terminal and configure the relay terminal to perform monitoring to detect control messages comprising the identifier of the relay terminal and to extract the scheduling information for both the first connection and the second connection upon detecting the identifier of the relay terminal in the control message.

11. The apparatus of claim 10, wherein the controller is further configured to use in a control message scheduling the same time-frequency resource to the first connection and the second connection, a multiplexing indicator indicating that at least one transport block of the first connection and at least one transport block of the second connection are multiplexed together into the same time-frequency resource.

12. The apparatus of claim 11, wherein the multiplexing indicator indicates the number of multiplexed transport blocks in the same time-frequency radio resource.

13. The apparatus according to claim 10, wherein the controller is further configured to conduct communication with respect to at least a third connection established as a relayed communication link between a third terminal device and the serving base station through the second terminal device operating as the relay terminal for the third connection, to use the scheduling information contained in a control message identifying the relay terminal in order to conduct the communication over the first, second and third connections, and to identify information elements related to the first terminal device and the third terminal device in the control message with a virtual identifier unique to each terminal device and shorter in length than the identifier of the relay terminal.

14. The apparatus according to claim 9, wherein the apparatus is applicable to the relay terminal, and wherein the uplink transport blocks of different connections are distinguished from each other on a physical layer, and wherein the controller is further configured to establish, with respect to each relayed communication link, a first logical connection between the relay terminal and the terminal device served by the relayed communication link and a second logical connection between the relay terminal and the serving base station, and to distinguish the downlink transport blocks of different connections from each other on a data link layer on the basis of different logical connections, wherein the data link layer is a layer higher than the physical layer.

15. The apparatus of claim 14, wherein the controller is further configured to discriminate logical connections associated with different terminal devices, with which the relay terminal provides a relayed communication link, with a unique virtual identifier included in each downlink data link layer data packet, wherein the virtual identifier is shorter in length than a cellular identifier identifying the terminal devices in a cellular telecommunication network comprising the serving base station.

16. The apparatus of claim 9, wherein the apparatus is further caused to multiplex a data transport block of the first connection and a data transport block of the second connection into the same time-frequency radio resource by using spatial multiplexing.

17. The apparatus of claim 9, wherein the apparatus is further caused to provide scheduling information of the first connection and scheduling information of the second connection in separate control messages, and configure the relay terminal to detect and receive control messages comprising the identifier of the first terminal device and to extract the scheduling information for the first connection up on detecting the identifier of the first terminal device in the control message.

18. A non-transitory computer readable medium storing a program of instructions, execution of which by a processor configures an apparatus to at least:
conduct communication, through an interface configured to transmit and receive information, with respect to a first connection established as a relayed communication link between a first terminal device and a serving base station through a second terminal device operating as a relay terminal for the relayed communication link;
conduct communication, through the interface, with respect to a second connection between the second terminal device and the serving base station;
use control messages defining dynamic radio resource allocation for both the first connection and the second connection in signaling exchanged between the serving base station and the relay terminal; and multiplex together at least one data transport block of the first connection and at least one data transport block of the second connection into a single super transport block of a predefined block size for transmission between the serving base station and the second terminal device in the same time-frequency radio resource allocated to both the first and second connections, wherein the time-frequency radio resource has a specified bandwidth and a specified duration.

* * * * *